US012570936B2

(12) United States Patent
Shigemasa et al.

(10) Patent No.: US 12,570,936 B2
(45) Date of Patent: Mar. 10, 2026

(54) WATER-SOLUBLE FILM, AND CHEMICAL AGENTS-ENCLOSING PACKAGING CAPSULE MATERIAL HAVING SAME

(71) Applicant: AICELLO CORPORATION, Toyohashi (JP)

(72) Inventors: Mizuki Shigemasa, Toyohashi (JP); Ryo Muramatsu, Toyohashi (JP); Hirokazu Ohsawa, Toyohashi (JP)

(73) Assignee: AICELLO CORPORATION, Toyohashi (JP)

( * ) Notice: Subject to any disclaimer, the term of this patent is extended or adjusted under 35 U.S.C. 154(b) by 752 days.

(21) Appl. No.: 17/791,465

(22) PCT Filed: Sep. 11, 2020

(86) PCT No.: PCT/JP2020/034550
§ 371 (c)(1),
(2) Date: Jul. 7, 2022

(87) PCT Pub. No.: WO2021/145021
PCT Pub. Date: Jul. 22, 2021

(65) Prior Publication Data
US 2023/0039669 A1      Feb. 9, 2023

(30) Foreign Application Priority Data

Jan. 14, 2020      (JP) ................................. 2020-004023

(51) Int. Cl.
| | |
|---|---|
| *B65D 65/46* | (2006.01) |
| *C08F 216/06* | (2006.01) |
| *C08J 5/18* | (2006.01) |
| *C08K 5/053* | (2006.01) |
| *C08L 29/04* | (2006.01) |
| *C11D 17/04* | (2006.01) |

(52) U.S. Cl.
CPC ............ *C11D 17/043* (2013.01); *B65D 65/46* (2013.01); *C08F 216/06* (2013.01); *C08J 5/18* (2013.01); *C08K 5/053* (2013.01); *C08L 29/04* (2013.01); *C08F 2810/00* (2013.01); *C08J 2329/04* (2013.01); *C08J 2429/04* (2013.01); *C08L 2203/16* (2013.01); *C08L 2205/025* (2013.01); *Y10T 428/1341* (2015.01)

(58) Field of Classification Search
CPC . C09D 129/04; C08L 29/04; C08L 2205/025; C08J 5/18; C08J 2329/04; C08F 216/06; C08F 218/08; C08F 222/02
See application file for complete search history.

(56) References Cited

U.S. PATENT DOCUMENTS

| | | | | |
|---|---|---|---|---|
| 4,747,976 | A | * | 5/1988 | Yang .................... C11D 17/042 |
| | | | | 525/61 |
| 4,885,105 | A | * | 12/1989 | Yang .................... C11D 17/042 |
| | | | | 525/61 |
| 6,818,709 | B1 | * | 11/2004 | Vicari ................... C08F 218/08 |
| | | | | 526/330 |
| 10,183,794 | B2 | * | 1/2019 | Souter ................ B65D 81/3261 |
| 11,453,754 | B2 | * | 9/2022 | Childers .............. C11D 17/043 |
| 2004/0186034 | A1 | * | 9/2004 | Verrall ...................... C08F 8/44 |
| | | | | 510/296 |
| 2009/0250370 | A1 | * | 10/2009 | Whitchurch ............ B29C 48/18 |
| | | | | 206/524.2 |
| 2009/0291282 | A1 | * | 11/2009 | Kitamura ............. C08K 5/0016 |
| | | | | 428/220 |
| 2011/0186467 | A1 | * | 8/2011 | Denome ................. C08L 29/04 |
| | | | | 524/387 |
| 2013/0240388 | A1 | * | 9/2013 | Koch ........................ B65B 1/02 |
| | | | | 206/223 |
| 2015/0210969 | A1 | * | 7/2015 | Brandt-Sanz ........... B29C 51/10 |
| | | | | 510/439 |
| 2016/0102278 | A1 | * | 4/2016 | Labeque .............. C11D 17/042 |
| | | | | 510/513 |
| 2017/0218146 | A1 | | 8/2017 | Childers et al. |
| 2017/0226338 | A1 | * | 8/2017 | Friedrich ............. C11D 17/042 |
| 2017/0298308 | A1 | * | 10/2017 | Labeque ................ B65D 43/22 |
| 2018/0002084 | A1 | | 1/2018 | Keuleers et al. |

(Continued)

FOREIGN PATENT DOCUMENTS

| | | |
|---|---|---|
| CA | 3096263 A1 | 10/2019 |
| CN | 109311574 A | 2/2019 |

(Continued)

OTHER PUBLICATIONS

Jan. 31, 2024 Office Action issued in Chinese Patent Application No. 202080092164.5
Dec. 1, 2020 International Search Report issued in International Patent Application No. PCT/JP2020/034550.
Mar. 31, 2025 Office Action issued in European Patent Application No. 20913835.3.
Anonymous: "Mowiol Polyvinyl Alcohol", Dec. 1999 (Dec. 1, 1999), pp. 1-105, XP093262543, Retrieved from the Internet: URL:https://ia903101.us.archive.org/35/items/polyvinylalcoholmanufacturemanual/Mowiol%20manual.
Dec. 15, 2023 Extended Search Report issued in European Patent Application No. 20913835.3.

(Continued)

*Primary Examiner* — Michael C. Romanowski
(74) *Attorney, Agent, or Firm* — Oliff PLC

(57)      ABSTRACT

A water-soluble film comprises one or more kinds of anion-group-modified polyvinyl alcohols including repeating units from a fatty acid vinyl ester comonomer and anion-group-containing repeating units, in which a degree of saponification thereof is set from 91 mol % or more to 99 mol % or less and a degree of modification by anion groups is set from 1.0 mol % or more to 6.0 mol % or less so that an amount of anion-group modification is set from 1.0 mol % or more to 3.5 mol % or less to a total amount of the anion-group-modified polyvinyl alcohols, and are formed by including less than 45 parts by mass of a plasticizer per 100 parts by mass of a total amount of the anion-group-modified polyvinyl alcohols, and have a tensile modulus of 100 MPa or less.

5 Claims, No Drawings

(56)                    References Cited

U.S. PATENT DOCUMENTS

| 2019/0194442 | A1 |   | 6/2019 | Ieda et al. | |
|---|---|---|---|---|---|
| 2019/0211289 | A1 | * | 7/2019 | Friedrich | C11D 3/50 |
| 2020/0199314 | A1 |   | 6/2020 | Hiura | |

FOREIGN PATENT DOCUMENTS

| EP | 3778761 | A1 |   | 2/2021 | |
|---|---|---|---|---|---|
| JP | 2002-275339 | A |   | 9/2002 | |
| JP | 2019-506495 | A |   | 3/2019 | |
| JP | 2019-520279 | A |   | 7/2019 | |
| JP | WO2019/078223 | A1 |   | 9/2020 | |
| JP | WO2019/124262 | A1 |   | 10/2020 | |
| WO | 2016/061025 | A1 |   | 4/2016 | |
| WO | 2017132540 | A1 |   | 8/2017 | |
| WO | WO-2019198683 | A1 | * | 10/2019 | B65D 65/46 |

OTHER PUBLICATIONS

Jul. 11, 2025 Office Action issued in Canadian Patent Application No. 3166984.

Nov. 20, 2025 Office Action issued in European Patent Application No. 20913835.3.

* cited by examiner

WATER-SOLUBLE FILM, AND CHEMICAL AGENTS-ENCLOSING PACKAGING CAPSULE MATERIAL HAVING SAME

TECHNICAL FIELD

The present invention relates to a water-soluble film for a packaging capsule used to mold a packaging capsule for enclosing chemical agents such as detergents, or the like, and the packaging capsule material for enclosing chemical agents using that one and another water-soluble film for a top.

BACKGROUND OF THE ART

Among chemical agents, detergents include a liquid detergent, a powder detergent, a gel detergent, a solid detergent, or the like. Among these, a liquid detergent is widely used as a dish-washing detergent and a laundry detergent. And these detergents were used by pouring from a bottle or container contained them to a cap, which is also served as a measuring device, and weighing.

In recent years, a number of packaging capsules enclosing a liquid detergent, a powder detergent and/or a gel detergent, especially a liquid detergent, as a dish-washing detergent and a laundry detergent are available on the market to make it easier to put it in a dish-washing machine or a washing machine. These packaging capsules can elute the detergents by dissolving a part of the film of the packaging capsule followed by cleavage through the contact with water in a dish-washing machine or in a washing machine.

As such a water-soluble film for the packaging capsule for enclosing detergents, especially a liquid detergent, polyvinyl alcohol resins, especially a modified polyvinyl alcohol as a copolymer of a fatty acid vinyl comonomer such as an acetic acid vinyl comonomer with an anionic comonomer, are conveniently used.

For example, Patent Document 1 discloses that a water-soluble film, which is useful for thermal-molding a deep drawing profile and this film contains a mixture of a water-soluble polyvinyl alcohol resin and a plasticizer, wherein the water-soluble polyvinyl alcohol resin contains a polyvinyl acetate co-maleic acid copolymer; this water-soluble polyvinyl alcohol resin has a viscosity in a range of about 14 cP-20 cP. In addition, it is characterized that heat-molded parts containing the water-soluble film have a heat-molded cavity on a wall, corner and bottom, and at least a draw rate of 3.5 is characteristic. And further, the heat-molded parts in which an average thickness of the heat-molded film near the lateral wall's bottom is at least 29% of the original film thickness are available for packaging detergents.

To mold a packaging capsule through deep drawing the water-soluble film, for example, a deep drawing packaging capsule-producing machine under vacuum molding is used. The deep drawing packaging capsule-producing machine can be used as follows. The water-soluble film is drawn out from a water-soluble film roll for the bottom followed by introducing onto a metal-mold with cavity; the film is sucked in the cavity of the metal-mold while heating and drawn to a packaging capsule bottom sheet with that form of depressions; chemical agents are filled into those depressions, and the chemical agents are enclosed and sealed by superimposing the water-soluble film for the top from above on a film portion formed around the perimeter edge of the depression through water-seal and/or heat-seal; the middle of the film portion formed around the perimeter edge is cut, and finally, after molding away from the metal-mold, the individually packaged deep drawing packaging capsule is prepared.

A packaging capsule enclosing chemical agents especially a liquid detergent has been required to dissolve quickly the water-soluble film and to elute the liquid detergent during cleaning or clothes-washing. And hence, it was desirable that moisture in a liquid detergent did not dissolve or break the packaging capsule and the time to elute was short when it came into contact with large amounts of water in a dish-washing machine or a washing machine. In addition, it was also important that the entire film of the capsule quickly dissolved and did not cause the residue. Thus, the main point of the packaging capsules was that they had a robust property against the liquid detergent and they were highly soluble in large amounts of water.

In recent years, however, a considerable attention has been focused on product safety, and safety standards have been enacted for the packaging capsule enclosing detergents and now are regulated in Europe and elsewhere. Then if a water-soluble film has simply a fast solubility speed, it may not necessarily be a satisfactory product.

For example, even if an infant accidentally mouths the packaging capsule enclosing a dish-washing detergent or a laundry detergent, it has become necessary not only to elute immediately such a detergent by dissolving the film of the packaging capsule but also to have a soluble resistance that does not make the detergent elute within 30 seconds in water at 20° C. In addition, it is required that the entire film of the capsule dissolves quickly during dish-washing and clothes-washing and does not cause the residue; namely, it is necessary to have also a contradictory effect of a complete-solubility property in a relatively short period of time.

And as before, it is more demanding to have a robust property that prevents leakage with a reasonable thickness and strength when chemical agents especially a liquid detergent were enclosed, but also to keep robustness not to make a break of flanks or angles of the depressions, which are relatively thin and drawn such as deep drawing. Furthermore, the influence of consumer preferences requires a capsule design that maintains the sense of capsule haptics (tension) even after a certain period of time after manufacturing capsules, and the use of water-soluble films also requires a device to maintain the sense of capsule haptics.

In addition, it is required that even for the film portion around the perimeter edge pasted with a water-soluble film for a bottom together with a water-soluble film for a top each capsule dissolves quickly during dish-washing and clothes-washing and does not cause the residue, and, on the other hand, has a strong-sealing property that prevents the film portion around the perimeter edge from peeling and releasing the contents during distribution or storage.

Furthermore, a water-soluble film for a bottom is required to have sufficient flexibility and processing-easiness for easy drawing such as deep drawing by addition of a plasticizer or choice of a resin, and also to have a temporal stability that does not bleed out the plasticizer.

Prior Art Document

Patent Document

Patent Document 1 Japanese Patent Application Publication No. 2019-506495

SUMMARY OF THE INVENTION

Problems to be Solved by the Invention

The present invention is made to solve the problems, and its object is to provide a water-soluble film for molding a packaging capsule as follows: a water-soluble film for molding a packaging capsule is capable of enclosing chemical agents especially a detergent such as a liquid detergent; it has a robust property that prevents leakage of the detergent with a reasonable thickness and strength and an easy-processing property that keeps robustness not to make a drawn portion break in mold-drawing-processing such as deep drawing; further it has a soluble resistance that does not make the detergent elute within 30 seconds in water at 20° C. and also a complete-solubility property within a relatively short period of time during dish-washing and clothes-washing; it has sufficient solubility and complete-solubility properties even for the film portion around the perimeter edge pasted with a water-soluble film for a top; it shows a strong-sealing property and also has a temporal stability.

Means for Solving Problems

A water-soluble film to achieve the objects described above comprises:

one or more kinds of anion-group-modified polyvinyl alcohols including repeating units from a fatty acid vinyl ester comonomer and anion-group-containing repeating units, in which a degree of saponification thereof is set from 91 mol % or more to 99 mol % or less and a degree of modification by anion groups is set from 1.0 mol % or more to 6.0 mol % or less so that an amount of anion-group modification is set from 1.0 mol % or more to 3.5 mol % or less to a total amount of the anion-group-modified polyvinyl alcohols.

It is formed by including less than 45 parts by mass of a plasticizer per 100 parts by mass of a total amount of the anion-group-modified polyvinyl alcohols And it has a tensile modulus of 100 MPa or less.

In the water-soluble film, the anion-group-modified polyvinyl alcohols consist of an anion-group-modified polyvinyl alcohol having a degree of saponification from 91 mol % or more to 96 mol % or less, and another anion-group-modified polyvinyl alcohol having a degree of saponification from 95 mol % or more to 99 mol % or less.

In the water-soluble film, a mass ratio between the anion-group-modified polyvinyl alcohol having a degree of saponification thereof from 91 mol % or more to 96 mol % or less and another anion-group-modified polyvinyl alcohol having a degree of saponification thereof from 95 mol % or more to 99 mol % or less, is more favorably 10-90:90-10.

In the water-soluble film, a viscosity of 4 mass % of an aqueous solution of the anion-group-modified polyvinyl alcohols is much more favorably set from 24 mPa·s or more to 45 mPa·s or less.

The water-soluble film further contains preferably a plasticizer being set from 22 parts by mass or more to less than 45 parts by mass per 100 parts by mass of the anion-group-modified polyvinyl alcohols.

It is preferable that in the water-soluble film, a time for starting a dispersion under stirring in water at 20° C. is 30 seconds or more at thickness of 75 μm thereof, and is 40 seconds or more at thickness of 90 μm thereof.

It is preferable that in the water-soluble film, a time for starting a dissolution under static immersion in water at 20°

C. is 50 seconds or more at thickness of 75 μm thereof, and more favorably 70 seconds or more at thickness of 90 μm thereof.

A packaging capsule material for enclosing chemical agents to achieve the objects described above comprises a combination of: the water-soluble film for molding a packaging capsule for enclosing chemical agents and another water-soluble film for a top consisting of anion-group-modified polyvinyl alcohols including repeating units from a fatty acid vinyl ester comonomer and anion-group-containing repeating units, in which a degree of saponification thereof is set from 86 mol % or more to 99 mol % or less. The water-soluble film for the top, in which a degree of saponification thereof is set from 88 mol % or more to 96 mol % or less, is more versatile.

In the packaging capsule for enclosing chemical agents, the packaging capsule material for enclosing chemical agents has preferably a soluble resistance so as not to elute the chemical agents within 30 seconds in water at 20° C.

In the packaging capsule material for enclosing chemical agents, the water-soluble film for the packaging capsule and another water-soluble film for the top have a solubility so that a film portion around the perimeter edge formed on a packaging capsule for the chemical agents by pasting those films together are solved within 10 minutes into water at 40° C.

Effects of the Invention

A water-soluble film for molding a packaging capsule of the present invention is used for enclosing chemical agents especially a liquid detergent.

The water-soluble film is used to mold the packaging capsule enclosing detergents used for cleaning dishes with a dish-washing machine and for washing a laundry with a washing machine.

The water-soluble film, in which the most light portion, for example, has a thickness of 20 μm or more to 30 μm or less thereof, is capable to carry out mold-drawing-processing such as deep drawing, and is used for preparing the packaging capsule for enclosing chemical agents to enclose the chemical agents into the molded depression through encapsulation with a film for a top.

Even if infants mistakenly imagined it as a candy or toy and accidentally took it into mouth, the packaging capsule molded by the water-soluble film has a reasonable soluble resistance that does not make a detergent elute from the packaging capsule enclosing chemical agents within 30 seconds in water at 20° C., because the solubility of the packaging capsule film is suppressed so that the chemical agents especially a detergent do not elute immediately to guarantee safety, and the dispersion time in water at 20° C. is 30 seconds or more at thickness of 75 μm thereof. However, because the water-soluble film cannot function without dissolution, once mixed with water by running a dish-washing machine or a washing machine, the film dissolves relatively quickly to elute the detergent, and even in the film portion around the perimeter edge pasted with the film for the top the film has a complete solubility property that can dissolve completely within 10 minutes in water at 40° C. and does not cause the residue. Accordingly, the water-soluble film and the molded packaging capsule both possess a reasonable soluble resistance, elution and complete-solubility properties.

Specifically, the water-soluble film has a dispersion time under stirring in water at 20° C. being favorably 30 seconds or more at thickness of 75 μm thereof, and more favorably 35 seconds or more. In addition, it is favorably 40 seconds or more at thickness of 90 μm thereof, and is more favorably 50 seconds or more.

In addition, the water-soluble film has a time for starting dissolution under static immersion in water at 20° C. being favorably 50 seconds or more at thickness of 75 μm thereof, more favorably 80 seconds or more, and most favorably 100 seconds or more. In addition, it is favorably 70 seconds or more at thickness of 90 μm thereof, more favorably 100 seconds or more, and most favorably 150 seconds or more.

The water-soluble film has a reasonable soluble resistance and does not dissolve in water immediately, but it exhibits an excellent water solubility: after that it quickly dissolves in water to cause breaking followed by elution of the chemical agents, and once dissolved and broken, the dissolution accelerates and there is no residue.

The water-soluble film contains different kinds of modification of anion-group-modified polyvinyl alcohols, different degree of modification, and their contents, and a suitable amount of a plasticizer, for example, being set to less than 45 parts by mass per 100 parts by mass of the anion-group-modified polyvinyl alcohols, specifically being set from 22 parts by mass or more to less than 45 parts by mass, favorably being set from 22 parts by mass or more to 44 parts or less by mass, more favorably being set from 25 parts by mass or more to 40 parts or less by mass, and most favorably being set from 25 parts by mass or more to 35 parts or less by mass. Thereby, it is reasonably flexible and easy to carry out drawing such as vacuum molding (thermoform) as well as deep drawing, and does not bleed out the plasticizer.

The water-soluble film is designed to enclose aqueous chemical agents, and therefore it has a robust property that prevents leakage of the chemical agents with a reasonable thickness and strength. Along with this, it has also a robust property not to make a drawn portion break from the film to the depression especially even at the corner of the depression or the lateral walls during molding the depression as a space for enclosing chemical agents through drawing such as deep drawing by vacuum molding from the water-soluble film. Accordingly, the water-soluble film should have reasonable thickness and strength that it is not too thick to dissolve and also it does not become too thin even when drawn.

A combination of the water-soluble film for the bottom, which can mold the depressions of a packaging capsule through drawing such as deep drawing by vacuum molding from the water-soluble film, and another water-soluble film for a top can provide a packaging capsule material, which is a material for molding the packaging capsule for enclosing chemical agents.

The packaging capsule material has sufficient solubility and complete-solubility properties even for the film portion around the perimeter edge where the water-soluble film for the bottom and another water-soluble film for a top are pasted together through water-seal and/or heat-seal, and further has a strong sealing-property that is difficult to peel off until chemical agents such as a detergent are eluted by dissolution.

As the packaging capsule material, the water-soluble film for the bottom has sufficient flexibility and processing-easiness for carrying out drawing such as deep drawing, and further this has not only an easy-sealing property between the water-soluble film for the bottom and the water-soluble film for the top, but also has a temporal stability to maintain tension without bleeding out the plasticizer.

The packaging capsule material, like the water-soluble film, have a reasonable soluble resistance, elution and complete-solubility properties.

MODE FOR CARRYING OUT THE INVENTION

The following details embodiments for carrying out the present invention, but the scope of the present invention is not limited to these embodiments.

The water-soluble film of the present invention is used for molding a packaging capsule enclosing chemical agents especially a detergent such as a liquid detergent, and is a resin film in which a copolymer of a fatty acid vinyl ester comonomer such as an acetic acid vinyl ester comonomer and an anionic comonomer such as an unsaturated carboxylic acid and its ester contains at least partially hydrolyzed acid-modified polyvinyl alcohols as a main component.

Specifically, the water-soluble film comprises: one or more kinds of anion-group-modified polyvinyl alcohols including repeating units from a fatty acid vinyl ester comonomer and anion-group-containing repeating units from an anionic comonomer, in which a degree of saponification thereof is set from 91 mol % or more to 99 mol % or less, favorably from 92 mol % or more to 99 mol % or less, and more favorably from 93 mol % or more to 97 mol % or less and a degree of modification by anion groups is set from 1.0 mol % or more to 6.0 mol % or less, favorably from 1.0 mol % or more to 4.0 mol % or less, and more favorably from 1.0 mol % or more to 3.5 mol % or less; an amount of modification is from 1.0 mol % or more to 3.5 mol % or less to a total amount of the anion-group-modified polyvinyl alcohols; it is molded by including less than 45 parts by mass, favorably 44 parts by mass at maximum of a plasticizer per 100 parts by mass of a total amount of the anion-group-modified polyvinyl alcohols; and it has a tensile modulus of 100 MPa or less.

It is favorable that the anion-group-modified polyvinyl alcohols in the water-soluble film is a maleic acid-modified polyvinyl alcohol, an itaconic acid-modified polyvinyl alcohol, a fumaric acid-modified polyvinyl alcohol, a crotonic acid-modified polyvinyl alcohol, an acrylic acid-modified polyvinyl alcohol, a metacrylic acid-modified polyvinyl alcohol, or a vinylsulfonic acid-modified polyvinyl alcohol, or a 2-acrylamide-2-methylpropanesulfonic acid-modified polyvinyl alcohol. Among these, the use of a maleic acid-modified polyvinyl alcohol is particularly favorable in view of processing, form-stability and solubility properties balance.

When the water-soluble film includes multiple kinds of the anion-group-modified polyvinyl alcohols, it is favorable that the anion-group-modified polyvinyl alcohols are composed of an anion-group-modified polyvinyl alcohol having a degree of saponification from 91 mol % or more to 96 mol % or less and another anion-group-modified polyvinyl alcohol having a degree of saponification from 95 mol % or more to 99 mol % or less, and a rate of mass between them is more favorably 10-90:90-10.

As a more specific example, when the water-soluble film includes multiple kinds of the anion-group-modified polyvinyl alcohols, it is molded while including at least one of the anion-group-modified polyvinyl alcohols containing repeating units from a fatty acid vinyl ester comonomer and anion-group-containing repeating units from an anionic comonomer, in which a degree of saponification is set from 91 mol % or more to 96 mol % or less, favorably from 92 mol % or more to 96 mol % or less or 91 mol % or more to less than 96 mol %, and more favorably from 93 mol % or more to 96 mol % or less, and another anion-group-modified polyvinyl alcohols containing repeating units from a fatty acid vinyl ester comonomer and anion-group-containing repeating units from an anionic comonomer, in which a degree of saponification is set from 95 mol % or more to 99 mol % or less, favorably from 96 mol % or more to 99 mol % or less, and more favorably from 96 mol % or more to 98 mol % or less.

Thus, if the water-soluble film is a mixture of the anion-group-modified polyvinyl alcohols having a degree of saponification from 91 mol % or more to 96 mol % or less and the anion-group-modified polyvinyl alcohols having a degree of saponification from 95 mol % or more to 99 mol % or less, depending on at least one of the differences between the type and the degree of modification of the modified anionic monomer and/or the difference of the degree of saponification, each has a different anion-group-modified polyvinyl alcohol, and then the film is made of the mixture of the polyvinyl alcohols that is rather easy to dissolve in water and the polyvinyl alcohols that is rather difficult to dissolve in water. Thus, when used for capsules, it is possible to possess both a soluble resistance that does not make the chemical agents elute within 30 seconds in water at 20° C. and a complete-solubility property within a short period of time during dish-washing and clothes-washing.

The degree of saponification is measured according to JIS K6726 (1994). Thus, the degree of saponification can be obtained by hydrolysis of the anion-group-modified polyvinyl alcohols with a specified amount of excess alkali followed by neutralization with a specified amount of acid and then back titration. The viscosity of 4 mol % of an aqueous solution thereof is measured according to JIS K6726 (1994).

The viscosity of 4 mass % of an aqueous solution of the anion-group-modified polyvinyl alcohols is favorably set from 24 mPa·s or more to 45 mPa·s or less, more favorably from 24 mPa·s or more to 35 mPa·s or less, and most favorably from 26 mPa·s or more to 32 mPa·s or less.

In addition, in the anion-group-modified polyvinyl alcohols, a degree of polymerization of repeating units from a fatty acid vinyl ester comonomer and anion-group-containing repeating units from an anionic comonomer is favorably set from 1500 or more to 2000 or less, more favorably from 1600 or more to 1900 or less, and most favorably from 1700 or more to 1800 or less.

In general, in the polyvinyl alcohol homopolymers, the highest solubility is found at a degree of saponification around 88 mol %, and the solubility is reduced, even higher or lower than that. Similarly, in the anion-group-modified polyvinyl alcohols, the solubility is also reduced, even if a degree of saponification is too high or too low. On the other hand, the solubility of the polyvinyl alcohol homopolymers depends not only on a degree of saponification but also on the viscosity and the molecular weight, that is, a degree of polymerization. And in the anion-group-modified polyvinyl alcohols, it is affected not only by a degree of saponification, the viscosity and the molecular weight, that is, a degree of polymerization but also the modified species and a degree of modification.

In general, the viscosity of the polyvinyl alcohol homopolymers depends on their molecular weights, that is, a degree of polymerization, and is also affected by a degree of saponification.

And the viscosity of the anion-group-modified polyvinyl alcohols also depends on their molecular weights, that is, a degree of polymerization, and is also affected by the modified species and a degree of modification.

When the water-soluble film includes multiple kinds of the anion-group-modified polyvinyl alcohols, the anion-group-modified polyvinyl alcohols having a degree of saponification from 91 mol % or more to 96 mol % or less and the anion-group-modified polyvinyl alcohols having a degree of saponification from 95 mol % or more to 99 mol % or less may have the same or different anion-groups each other.

When the water-soluble film includes multiple kinds of the anion-group-modified polyvinyl alcohols, for example, the mass ratio between the anion-group-modified polyvinyl alcohol having a degree of saponification from 91 mol % or more to 96 mol % or less and another anion-group-modified polyvinyl alcohols having a degree of saponification from 95 mol % or more to 99 mol % or less, is greater than 0 and less than 100 versus less than 100 and greater than 0, or more favorably 1:99-99:1.

By making the constitution like this water-soluble film, when this was molded to the packaging capsule for enclosing chemical agents, this shows water solubility so that it can be dissolved by water or lukewarm water in a dish-washing machine or a washing machine to elute the chemical agents.

The water-soluble film can serve as a water-soluble film for a bottom for molding the depressions of a packaging capsule, and can be used as a roll.

In addition, to ensure safety even when infants took it into their mouths, when the water-soluble film was molded into the packaging capsule enclosed chemical agents, this has a reasonable soluble resistance that does not make the chemical agents elute within 30 seconds in water at 20° C., a solubility or elution property that quickly dissolves in more time followed by breaking and finally elutes the chemical agents, and further a complete-solubility property that the water-soluble film itself can dissolve completely within 5 minutes in water at 20° C., favorably within 3 minutes, and does not cause the residue. Filling all of these properties cannot be achieved simply by adjusting a degree of saponification. In particular, for the anion-group-modified polyvinyl alcohols having a degree of saponification with 86 mol % or more to 92 mol % or less hydrolyzed and the residue unhydrolyzed, at least one of those properties will be insufficient.

In the water-soluble film, when the anion-group-modified polyvinyl alcohols consists of the anion-group-modified polyvinyl alcohols having a degree of saponification from 91 mol % or more to 96 mol % or less and another anion-group-modified polyvinyl alcohols having a degree of saponification from 95 mol % or more to 99 mol % or less, a degree of saponification of the total anion-group-modified polyvinyl alcohols in the water-soluble film should be set from 91 mol % or more to 99 mol % or less, favorably 92 mol % or more to 99 mol % or less, and more favorably 93 mol % or more to 97 mol % or less. The mass ratio between the anion-group-modified polyvinyl alcohols having the degree of saponification from 91 mol % or more to 96 mol % or less and another anion-group-modified polyvinyl alcohols having the degree of saponification from 95 mol % or more to 99 mol % or less is favorably 10-90:90-10, more favorably 20-80:80-20, much more favorably 30-70:70-30, and most favorably 30-50:70-50. By using these different two kinds of the anion-group-modified polyvinyl alcohols after mixing, ones having a higher degree of saponification are difficult to dissolve into a cold water, and another ones having a lower degree of saponification are easy to dissolve into a cold or warm water. Accordingly, by balancing the two, it is possible to adjust and hold conflicting physical properties: namely, a reasonable soluble resistance in a relatively short period of time, a smooth solubility or elution property in more time, and a complete-solubility property.

In the water-soluble film, the anion-group-modified polyvinyl alcohols are not particularly limited, when it contains repeating units from a fatty acid vinyl ester comonomer and anion-group-containing repeating units, and one or more kinds of the anion-group-modified polyvinyl alcohols in which a degree of saponification thereof is set from 91 mol % or more to 99 mol % or less and a degree of modification by anion groups is set from 1.0 mol % or more to 6.0 mol % or less. Among them, as the anion-group-modified polyvinyl alcohols, whether it is the anion-group-modified polyvinyl alcohols in which a degree of saponification thereof is set from 91 mol % or more to 96 mol % or less or the anion-group-modified polyvinyl alcohols in which a degree of saponification thereof is set from 95 mol % or more to 99 mol % or less, as the individual anion-group-modified polyvinyl alcohols commercially available ones have a rate of anion-group modification by the anionic comonomer from 1 mol % or more to 10 mol % or less, but favorably from 1.0 mol % or more to 6.0 mol % or less, more favorably from 1.0 mol % or more to 4.0 mol % or less, and most favorably from 1.0 mol % or more to 3.5 mol % or less.

When the water-soluble film includes one kind of the anion-group-modified polyvinyl alcohols, a degree of saponification thereof is inevitably set from 91 mol % or more to 99 mol % or less, favorably from 92 mol % or more to 99 mol % or less, and more favorably from 93 mol % or more to 97 mol % or less, and thus the anion-group-modified polyvinyl alcohols in which a rate of anion-group modification thereof is set from 1.0 mol % or more to 3.5 mol % or less are used.

On the other hand, when it includes two or more kinds of the anion-group-modified polyvinyl alcohols, each of the anion-group-modified polyvinyl alcohols may have a degree of modification by anion groups from 1.0 mol % or more to 6.0 mol % or less. However, the mixing ratio of each of the anion-group-modified polyvinyl alcohols in two or more kinds should be adjusted as appropriate so that an amount of anion-group modification is set from 1.0 mol % or more to 3.5 mol % or less and favorably from 1.5 mol % or more to 3.0 mol % or less to a total amount of the anion-group-modified polyvinyl alcohols.

By the way, the degree of modification by anion groups in one or more kinds of the anion-group-modified polyvinyl alcohols can be expressed as the ratio of the number of moles of anion-group-containing repeating units to the total number of moles of repeating units from a fatty acid vinyl ester comonomer such as vinyl alcohol repeating units and vinyl ester repeating units and anion-group-containing repeating units.

The water-soluble film comprises at least one or more of the plasticizer selected from glycerin, diglycerin, polyglycerol, ethylene glycol, diethylene glycol, triethylene glycol, tetraethylene glycol, trimethylolpropane, propylene glycol, dipropylene glycol, polypropylene glycol, polyethylene glycol, 1,3-butanediol, erythritol, xylitol, glucose, fructose, maltitol, lactose, triethanolamine, triethanolamine acetate, and ethanol acetamide, bisphenol A, bisphenol S, sorbitol, N-methylpyrrolidone, pentaerythritol, and the addition compounds of ethylene oxide with polyvalent alcohols such as glycerin, pentaerythritol, and sorbitol being set favorably 45 parts by mass or less, more favorably over 21 parts by mass and less than 45 parts by mass per 100 parts by mass of the anion-group-modified polyvinyl alcohols. The plasticizer can supply flexibility and facilitate drawing such as deep drawing. If this range was lower, the molding property during drawing such as deep drawing will be reduced and will not follow the metal-mold cavity. On the other hand, if this range was higher, the plasticizer may bleed out and precipitate over time.

The thickness of the water-soluble film can be set as appropriate to a range from 20 μm or more to 100 μm or less. However, to fulfill the properties such as a soluble resistance and a solubility or elution and complete-solubility properties, it is favorable to have a range from 25 μm or more to 95 μm or less, more favorably 30 μm or more to 90 μm or less. Since at the corner of the depression or the lateral walls, the water-soluble film will be drawn and thinly layered by drawing such as deep drawing, to fulfill these properties even when thinly layered, it is desirable to have an elution resistance that will not start dissolving in water to prevent the contents eluting in water for 30 seconds at 20° C. if the thickness is 75 μm and to prevent the contents eluting in water for 40 seconds at 20° C. if the thickness is 90 μm. In addition, in the film portion around the perimeter edge pasted between the water-soluble film for the bottom at thickness of 90 μm thereof and another water-soluble film for a top at thickness of 75 μm thereof to provide the packaging capsule, it is desirable to have a complete-solubility property that the film can dissolve completely within 10 minutes in water at 40° C. and there is no residue. However, if drawing such as deep drawing was performed at the corner of the depression or the lateral walls so that the thinnest portion became thinner than 20 μm thereof, these properties are not fully satisfied.

The water-soluble film, for example, has a tensile modulus of 100 MPa or less. Higher than this range is too hard, and hence the thermo-form property become poor and it becomes difficult to mold. The tensile modulus can be set more favorably from 10 MPa or more to 90 MPa or less, and most favorably from 20 MPa or more to 70 MPa or less.

Furthermore, the water-soluble film may contain additives, if necessary. As additives, the conventional additives such as a filler, an anti-blocking agent, a slip agent, an anti-static agent, a colorant, a flavoring agent, an extender, a defoamer, a release agent, an ultraviolet absorber, a surfactant, and an aversive agent can be blended as appropriate.

The water-soluble film may be a smooth film, and also may be a mat-like film with an uneven surface due to embossing or casting to the uneven surfaces. Filling with a liquid detergent with the uneven mat surface on the inside of the capsule will provide a glossy appearance.

In addition, to improve the film slippage, the water-soluble film may be attached to the film surface by applying powder, grease, or the like.

In the water-soluble film, the anion-group-modified polyvinyl alcohols may include a comonomer to form the repeating units in addition to the repeating units from an anionic comonomer: olefins such as ethylene, propylene, isobutylene, α-octene, α-dodecene, and α-octadecene; nitriles such as acrylonitrile and metacrylonitrile; amides such as acrylamide and metacrylamide; alkyl vinyl ethers; dimethylallyl vinyl ketone; N-vinylpyrrolidone; vinyl chloride, vinylidene chloride; polyoxyalkylene (meta)allyl ethers such as polyoxyethylene (meta)allyl ether and polyoxypropylene (meta)allyl ether; polyoxyalkylene (meta) acrylates such as polyoxyethylene (meta)acrylate and polyoxypropylene (meta)acrylate; polyoxyalkylene (meta) acrylamides such as polyoxyethylene (meta)acrylamide and polyoxypropylene (meta)acrylamide; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; diacrylacetoneamide.

The packaging capsule material for enclosing chemical agents is a combination material between the film for the bottom of packaging capsules in which the water-soluble film is subject to drawing such as deep drawing and the water-soluble film for the top composed of the anion-group-modified polyvinylalcohols in which a degree of saponification of repeating units from a fatty acid vinyl ester comonomer is set from 86 mol % or more to 99 mol % or less. The water-soluble film for the top, except for the same or different degree of saponification, can be selected for use as appropriate from similar or different types of resin films similar to the anion-group-modified polyvinyl alcohols as exemplified in the water-soluble film for the bottom.

The packaging capsule material is used to prepare the packaging capsule for enclosing chemical agents in which a cavity encapsulating the chemical agents especially a detergent is molded, because the sheets composed of the water-soluble film for molding a packaging capsule and the water-soluble film for the top are pasted together in four sides or periphery at the film portion around the perimeter edge.

For the packaging capsule material, it is desirable that the chemical agents are a dish-washing detergent, a laundry detergent, or a household care composition.

The packaging capsule material for enclosing chemical agents can be used as follows. The water-soluble film is drawn out from the water-soluble film roll for the bottom by using a deep-drawing packaging capsule manufacturing machine for vacuum molding. Onto the metal-mold having a cavity corresponding to the depression that will enclose the chemical agents such as a liquid detergent, the water-soluble film for the bottom is introduced. The thermoplastic water-soluble film for the bottom is heated to 70-120° C. followed by close to the multiple cavity openings, the cavity inside is sucked by vacuum suction with a vacuum pump connected to the cavity, and then the water-soluble film for the bottom is drawn to the shape of the cavity to give the packaging capsule bottom sheet with a molded depression. To the depression of the packaging capsule bottom sheet is packed an adequate amount of the chemical agents. The water-soluble film is drawn out from the water-soluble film roll for the top, and, if necessary, after applying water, the packaging capsule bottom sheet is covered together with the chemical agents. Heat sealing and/or press-sealing in the film portion around the perimeter edge corresponding to the edge of the depression make a seal between the water-soluble film for the bottom and the water-soluble film for the top in the film portion around the perimeter edge. Cutting the middle of the film portion around the perimeter edge gives the individually wrapped deep drawing packaging capsule.

As the water-soluble film for enclosing chemical agents and the packaging capsule using it, some examples of how to enclose a liquid detergent were shown. However, it may also enclose a liquid detergent together with a powder detergent and/or a gel detergent. The shallow depth of the packaging capsule can be adjusted as appropriate to the extent that it can withstand deep drawing.

Embodiments

The following shows examples of the implementation of the present invention and comparative examples of the non-application of the present invention.

The polyvinyl alcohol (PVA) resin used in each of the implementation examples and comparison examples is as follows.

Resin 1:4 mass % of the aqueous solution viscosity 29 mPa·s, a degree of polymerization 1700, a degree of saponification 97 mol %, a degree of modification 1.9 mol %, maleic acid modified polyvinyl alcohol.

Resin 2:4 mass % of the aqueous solution viscosity 28 mPa·s, a degree of polymerization 1700, a degree of saponification 93 mol %, a degree of modification 1.9 mol %, maleic acid modified polyvinyl alcohol.

Resin 3:4 mass % of the aqueous solution viscosity 28 mPa·s, a degree of polymerization 1700, a degree of saponification 88 mol %, a degree of modification 1.9 mol %, maleic acid modified polyvinyl alcohol.

Resin 4:4 mass % of the aqueous solution viscosity 29 mPa·s, a degree of polymerization 1700, a degree of saponification 94 mol %, a degree of modification 3.6 mol %, maleic acid modified polyvinyl alcohol.

Example 1 (A): Preparation of Water-Soluble Film

The water-soluble anion-group-modified polyvinyl alcohol composition was prepared by blending and kneading 30 parts by mass of glycerin as a plasticizer, 1.5 parts by mass of sodium sulfite, 0.5 parts by mass of sodium polyoxyethylene lauryl ether acetate, and water per 100 parts by mass of Resin 1 of the anion-group-modified polyvinyl alcohols partially-hydrolyzed from acetic acid vinyl ester·maleic acid comonomer. The viscosity of the composition was approximately 3000 mPa·s when measured with a type B viscometer at 85° C. As a cast surface a smooth metal roll was prepared, and its surface was cleaned by wiping with a cloth dampened with pure water. While the surface temperature of the metal roll was being heated to about 80° C., the water-soluble anion-group-modified polyvinyl alcohol composition was cast to the metal roll to obtain the desired thickness. The metal roll was dried for 5-10 minutes while rotating to give the water-soluble film for molding a packaging capsule enclosing chemical agents at thickness of 20-90 μm (20, 30, 40, 50, 75 and 90 μm) thereof.

Example 2 (A)-Example 7 (A), Comparative Example 1 (A)-Comparative Example 5 (A): Preparation of Water-Soluble Films As shown in Tables 1 and 2, except for the use of the anion-group-modified polyvinyl alcohols partially-hydrolyzed from acetic acid vinyl ester·maleic acid comonomer and the plasticizer shown in Table 1, in the same manner as in Example 1 (A), the water-soluble film for molding a packaging capsules shown in Examples 2 (A)-7 (A) of the implementation of the present invention and the water-soluble films shown in Comparative examples 1 (A)-5 (A) of the non-application of the present invention were prepared.

Example 8 (A): Preparation of Water-Soluble Film

By using the anion-group-modified polyvinyl alcohols partially-hydrolyzed from acetic acid vinyl ester maleic acid comonomer and the plasticizer shown in Table 1, the water-soluble anion-group-modified polyvinyl alcohol composition was prepared by blending and kneading 1.5 parts by mass of sodium sulfite, 2 parts of high amylose cornstarch (average particle diameter 15 μm, apparent specific gravity 0.40-0.70 g/ml), 0.2 parts of sodium di-2-ethylhexylsulfosuccinate:dioctyl sulfosuccinate, 0.2 parts of polyoxyethylene alkyl ether sulfate sulfuric acid salt, and water. The viscosity of the composition was approximately 3000 mPa's when measured with a type B viscometer at 85° C. As a cast surface, a smooth metal roll with an uneven surface by mat finish was prepared, and its surface was cleaned by wiping with a cloth dampened with pure water. While the surface temperature of the metal roll was being heated to about 80° C., the water-soluble anion-group-modified polyvinyl alcohol composition was cast to the metal roll to obtain the desired thickness. The metal roll was dried for 5-10 minutes while rotating to give the water-soluble film for molding a packaging capsule enclosing chemical agents at thickness of 20-90 μm (20, 30, 40, 50, 75 and 90 μm) thereof.

The water-soluble film obtained was evaluated as follows.

Solubility Evaluation Test 1 on Water-Soluble Film Alone: 20° C. ASM Evaluation Test The water-soluble films at respective thickness obtained in Example 1 (A)-Example 8 (A) and Comparative example 1 (A)-Comparative example 5 (A) were cut to 39 mm×32 mm to obtain the film specimens. Each of the film specimens was inserted separately to two rectangular plastic mounts with 34 mm×23 mm windows inside so that the window was blocked, set, and fixed to a hanging fixture. Next, the water bath by putting 800 mL of distilled water in a 1 L beaker with a water temperature of 20° C. was stirred with a stirrer (stirrer tip length: about 5 cm, rotation speed: 400 rpm). The film specimen fixed to the plastic mount attached to the hanging fixture was immersed in the water in the bath, and the dispersion time was measured at the point at which one of the film specimens was broken. After confirming the dispersion time, the film specimen was knocked off the plastic mount by tapping it up and down, and the film specimen was made floating in water. Then the complete solubility time was measured at the point at which all of the film specimens had dissolved and the remainder could not be detected visually. Here, dissolution means that the film will be invisible, and dispersion of insoluble particles with a diameter of 1 mm or less is also included in the meaning of dissolution. The results are summarized in Tables 1 and 2.

Solubility Evaluation Test 2 on Water-Soluble Film Alone: 20° C. SD Evaluation Test Two rectangular plastic-mounted windows with 34 mm×23 mm windows were opened by cutting one side of the long side of the window, and the reverse U-shaped cut-out plastic mount with a 34 mm width was prepared. The water-soluble films at respective thickness obtained in Examples 1 (A)-8 (A) and Comparative examples 1 (A)-5 (A) were cut to 39 mm×32 mm, which is larger than the opening of the cut-out plastic mount, to obtain the film specimens. Each of the film specimens was inserted separately to the reverse U-shaped cut-out plastic mount so that the window was blocked, set, and fixed to a special fixture. The film specimen fixed to the cut-out plastic mount attached to the hanging fixture was inserted into the water with a water temperature of 20° C. in the pre-prepared bath (1 L of beaker, 800 mL of distilled water, no stirring), and the whole film specimen was made immersing. At this point, the cut-out plastic mount was left in the water so that it was inverted U-shaped and the opening was facing down. Then the solubility time was measured at the point at which the film specimen on a upper portion of the cut-out plastic mount was creates a tear. The results are shown in Tables 1 and 2.

(Tensile Modulus Measurement Test)

The water-soluble films obtained in Examples 1 (A)-8 (A) and Comparative examples 1 (A)-5 (A) were measured with a Tensile Tester AGS-1 kN (Shimadzu Co. Ltd.; trade name) based on JIS K 7127 (1999). The measurement conditions are as follows.

Measurement environment: 23° C., 50% RH

Film specimen: width 15 mm×length 150 mm

Distance between chucks: 100 mm

Tensile test speed: 300 mm/min

The film used for the measurement was damped in a given environment so that a water content was 5-9%.

The obtained results of the tensile modulus and the film water content are summarized in Tables 1 and 2.

(Water Content Measurement Test)

The water content of the water-soluble film used for the tensile modulus measurement test was measured with a Karl Fischer Titrator AQV-2200s (Hiranuma Co., Ltd.: trade name).

Example 1 (B)-Example 8 (B), and Comparative Example 1 (B)-Comparative Example 2 (B), Comparative Example 5 (B): Preparation of Capsules for the Solubility Measurement

[Water-Soluble Film Used]

The capsule was prepared using a water-soluble film for a bottom and a water-soluble film for a top, and the solubility was evaluated. As a film for, a top the water-soluble films at thickness of 75 μm thereof prepared in Comparative example 2 (A) were used.

As a film for a bottom, the water-soluble films at thickness of 30 μm, 40 μm and 50 μm thereof prepared in Example 1 (A)-Example 8 (A), and Comparative example 1 (A)-Comparative example 2 (A), Comparative example 5 (A) were used.

[Liquid Detergent for Clothes-Washing Used]

As a liquid detergent for clothes-washing, a total of 100 mass % of the detergent, which is composed of 35.5 mass % of a straight chain alkyl (C10-C15) benzenesulfonic acid, 5 mass % of monoethanolamine, 21 mass % of glycerin, 28 mass % of propylene glycol, 0.5 mass % of sodium sulfite, and 10 mass % of water, was prepared.

[Preparation Method of Capsules]

Each of the water-soluble films for the bottom prepared in Example 1 (A)-Example 8 (A), and Comparative example 1 (A)-Comparative example 2 (A), Comparative example 5 (A) was set on a metal-mold with cavity 1 (box-shaped cavity with rounded corners with an opening area 2000 mm² and a depth 15 mm) under tight conditions to avoid wrinkles and sagging. The water-soluble film was heated at about 90° C. for 3 seconds, and the water-soluble film was followed into the cavity 1 by vacuum molding to mold the water-soluble sheets with depressions. To the depression of the water-soluble film sheets on the cavity 1 was inserted 22 mL of the liquid detergent for clothes-washing prepared. Next, water was applied to the water-soluble film at thickness of 75 μm thereof prepared in Comparative example 2 (A) as the film for the top by using a lab towel (Unichemy Co., Ltd.) dampened with water to achieve a water-coating amount of 35-50 g/m². After the water-applied film for the top was immediately press-pasted by using the water-soluble film sheet and 1.5 kg of a metal roll at the edge of the depression of the bottom side followed by keeping it for 1 minute 30 seconds, vacuum suction was stopped, the capsule sheet was taken out from the cavity 1 and cut off, and each of the capsule test samples for Example 1 (B)-Example 8 (B), and Comparative example 1 (B)-Comparative example 2 (B), Comparative example 5 (B) was prepared. In the case of Example 1 (B)-Example 7 (B), and Comparative example 1 (B)-Comparative example 2 (B), Comparative example 5 (B) it was pasted so that the cast side was outside the capsule, and in Example 8 (B) it was pasted so that the cast side was inside the capsule. All capsules had a glossy capsule appearance.

(Solubility Evaluation Test on Capsules)

First of all, into a cage with a metal lid was introduced only one capsule test sample for each of Example 1 (B)-Example 8 (B), and Comparative example 1 (B)-Comparative example 2 (B), Comparative example 5 (B) with the bottom side of the capsule facing up, and the lid closed. While the 1 L beaker was filled with 1 L of distilled water and kept 20° C., this was slowly put into the beaker so that the cage with the metal lid was completely immersed. Then the solubility time (seconds) was measured at the point at which the air or the detergent inside the capsule was leaked. The results are summarized in Tables 1 and 2.

Example 1 (C)-Example 8 (C), and Comparative Example 1 (C)-Comparative Example 2 (C), Comparative Example 5 (C): Preparation of Empty Capsules Except that a liquid detergent for clothes-washing was not used, in a similar manner of the preparation of capsules shown in Example 1 (B)-Example 8 (B), and Comparative example 1 (B)-Comparative example 2 (B), Comparative example 5 (B), the empty capsules of Example 1 (C)-Example 8 (C), and Comparative example 1 (C)-Comparative example 2 (C), Comparative example 5 (C) were prepared.

(Minimum Thickness Measurement Test)

On the bottom sides of the empty capsules of Example 1 (C)-Example 8 (C), and Comparative example 1 (C)-Comparative example 2 (C), Comparative example 5 (C) were plotted the measurement points at equal intervals, and thickness measurement was performed on a total of 49 points of 7 points high×7 points wide with a Dial gauge (Mitutoyo Co., Ltd.). Among these the results of minimum thickness are summarized in Tables 1 and 2.

Example 1 (D)-Example 8 (D), and Comparative Example 1 (D)-Comparative Example 2 (D): Preparation of Heat-Seal Pasting Films Two sheets of the polyvinyl alcohol-based resin films of Example 1 (A)-Example 8 (A), and Comparative example 1 (A)-Comparative example 2 (A) at thickness of 75 μm and 90 μm thereof were stacked followed by heat-sealing with a Heat seal tester TP-701B (Tester Sangyo Co., Ltd.: trade name) to give the pasting films.

In addition, the films of Example 1 (A)-Example 8 (A) at thickness of 90 μm thereof and the films in Comparative example 2 (A) at thickness of 75 μm thereof were superimposed followed by heat-sealing to give the pasting films.

Heat-sealing conditions are as follows.

Seal top: aluminum sealing bar with Teflon coating (Teflon is a registered trademark) with a 10 mm width, 160° C.

Seal bottom: rubber plate with Teflon taping (Teflon is a registered trademark), 30° C.

Sealing time: 1 second

Sealing pressure: 0.2 MPa

From the pasting films the solubility test samples with a heat-seal pasting portion were cut out to a size of 9 mm×32 mm to give the film specimens of Example 1 (D)-Example 8 (D), and Comparative example 1 (D)-Comparative example (2D).

(Solubility Test on Heat-Seal Pasting Portion: 40° C. ASM-R Test)

The film specimens of the heat-seal pasting portion for the solubility test samples cut out to a size of 9 mm×32 mm were set on the center of the window along the short direction of the two rectangular plastic mounts with a 34 mm×23 mm window, and fixed to a hanging fixture. Next, a water bath by putting 800 mL of distilled water in a 1 L beaker with a water temperature of 40° C. was stirred with a stirrer (stirrer tip length: about 5 cm, rotation speed: 400 rpm). The film specimen fixed to the plastic mount attached to the hanging fixture was immersed in the water in the bath, and, after confirming that one of the film specimens was broken, the film specimen was knocked off the plastic mount by tapping it up and down and the film specimen was made floating in water. Then the complete solubility time was determined at the point at which all of the film specimens had dissolved and the remainder could not be detected visually. When it was judged to be completely dissolved, the stirring was stopped, and the residue was confirmed as a series of processes. Here, dissolution means that the film will be invisible, and dispersion of insoluble particles with a diameter of 1 mm or less is also included in the meaning of dissolution. The results are summarized in Tables 1 and 2.

Example 1 (E)-Example 8 (E), and Comparative Example 1 (E)-Comparative Example 2 (E): Preparation of Water-Seal Pasting Film Each of the polyvinyl alcohol-based resin films of Examples 1 (A)-8 (A) and Comparative examples 1 (A)-2 (A) at thickness of 75 μm and 90 μm thereof was cut off to the A4-size. Then a piece of the film sheet at thickness of 75 μm thereof was applied with a lab towel (Unichemy Co., Ltd.) dampened with water to achieve a water-coating amount of 35-50 g/m². Immediately, on this sheet was overlapped a piece of the film sheet at thickness of 90 μm thereof that had not been applied with water followed by press-pasting three times by using 1.5 kg of an aluminum roller. On the other hand, on the film sheet at thickness of 75 μm thereof of Comparative example 2 (A) that had been applied with water was overlapped the film at thickness of 90 μm thereof of Example 1 (A)-Example 8 (A) that had not been applied with water, and another film was also prepared with different film types at the top and bottom. The pasting film obtained was cut out to a size of 9 mm×32 mm to give the film of Example 1 (E)-Example 8 (E), and Comparative example specimens 1 (E)-Comparative example (2E) as the film specimens of the water-seal pasting portion for the solubility test samples (Solubility Test on Water-Seal Pasting Portion: 40° C. ASM-R Test)

Similarly as described in the solubility test on the heat-seal pasting portion, the solubility of the film specimens of Example 1 (E)-Example 8 (E), and Comparative example 1 (E)-Comparative example (2E) was examined. The results are summarized in Tables 1 and 2.

Example 1 (F)-Example 8 (F), and Comparative Example 1 (F)-Comparative Example (5F): Preparation of Capsule Bottom and Thermo-Form Suitability Evaluation Test Each of the water-soluble film for the bottom at thickness of 90 μm thereof prepared in Example 1 (A)-Example 8 (A), and Comparative example 1 (A)-Comparative example 5 (A) was set on a metal-mold with a cavity 2 (box-shaped cavity having rounded corners with an opening area 1800 mm² and a depth 25 mm) under tight conditions to avoid wrinkles and sagging. The water-soluble film was heated at about 90° C. for 3 seconds followed by vacuum molding to obtain the capsule bottoms of Example 1 (F)-Example 8 (F), and Comparative example 1 (F)-Comparative example (5F). After vacuum suctioning, the thermo-form suitability was evaluated: the water-soluble film followed the cavity 2 with good, and unfollowed with failing In the unfollowed case a specified amount of the contents does not enter and the quality required for the product is not satisfied. The results of thermo-form suitability are summarized in Tables 1 and 2.

Example 1 (G)-Example 8 (G), Comparative Example 1 (G)-Comparative Example (2G), Comparative Example (5G): Preparation of Capsules for Tension Measurement

[Water-Soluble Film Used]

By using the water-soluble film for the top and the water-soluble film for the bottom, the capsule was prepared, and its tension was evaluated. As the water-soluble film for the top and the water-soluble film for the bottom, the water-soluble films at thickness of 75 μm thereof prepared in Example 1 (A)-Example 8 (A), and Comparative example 1 (A)-Comparative example (2A), Comparative example (5A) were used.

[Liquid Detergent for Clothes-Washing Used] and [Preparation Method of Capsule]

Except that the water-soluble film was replaced, in a similar manner shown in Example 1 (B)-Example 8 (B), and Comparative example 1 (B)-Comparative example 2 (B), Comparative example 5 (B), each of the capsule test samples of Example 1 (G)-Example 8 (G), and Comparative example 1 (G)-Comparative example 2 (G), Comparative example 5 (G) was prepared.

(Capsule Haptics Retention Test)

After the capsule test samples of Example 1 (G)-Example 8 (G), and Comparative example 1 (G)-Comparative example 2 (G), Comparative example 5 (G) were taken out from the cavity, the samples were left at room temperature for about 7 minutes. After about 7 minutes, the height of the capsule test samples was measured with a height gauge Absolute Digimatic Height Gauge (Mitutoyo Co., Ltd.: trade name), and the initial height (h0) was taken. Then, after storage under 23° C.-50% RH conditions, the capsule height after 3 days was set to the height after storage (h1). The capsule height maintenance rate=h1/h0 was set to excellent as a capsule height maintenance rate of more than 86%, good as 80% or more to 86% or less, and passed as less than 80%. Excellent and good mean that the capsule haptics is suitable and have a more consumer-preferred look. The results of the capsule height maintenance rate are summarized in Tables 1 and 2.

(Bleed Resistance Evaluation Test)

The water-soluble films at thickness of 90 μm thereof prepared in Example 1 (A)-Example 8 (A), Comparative example 1 (A)-Comparative example 5 (A) were left at 23° C. under 80% RH conditions in the exposed state for 1 week. After 1 week, the bleed resistance of the film was evaluated visually: the film will be visible with failing and invisible with good. The results are summarized in Tables 1 and 2.

TABLE 1

| | | | Example | | | | | | | |
|---|---|---|---|---|---|---|---|---|---|---|
| Water-soluble film for the bottom | | | 1 | 2 | 3 | 4 | 5 | 6 | 7 | 8 |
| PVA (Parts by mass) | Resin 1 | | 100 | 70 | | 50 | 30 | 70 | 70 | 70 |
| | Resin 2 | | | 30 | 100 | 50 | 70 | 30 | | 30 |
| | Resin 3 | | | | | | | | | |
| | Resin 4 | | | | | | | | 30 | |
| Plasticizer (Parts by mass) | Glycerin | | 30 | 30 | 30 | 30 | 30 | 30 | 30 | 30 |
| | Sorbitol | | | | | | | 5 | | |
| Solubility of film alone | 20° C. ASM (seconds) Dispersion time/complete solubility time | 20 μm | 2/9 | 3/9 | 2/7 | 2/8 | 2/7 | 3/9 | 2/7 | 3/9 |
| | | 30 μm | 7/16 | 6/15 | 4/10 | 5/10 | 6/12 | 5/13 | 5/10 | 6/15 |
| | | 40 μm | 15/30 | 12/25 | 8/15 | 13/23 | 11/20 | 11/21 | 10/19 | 12/23 |
| | | 75 μm | 55/121 | 49/92 | 34/55 | 43/74 | 38/64 | 45/86 | 41/73 | 47/95 |
| | | 90 μm | 83/169 | 71/134 | 49/77 | 60/110 | 58/96 | 65/126 | 55/101 | 66/140 |
| | 20° C. SD (seconds) Solubility time | 20 μm | 8 | 6 | 6 | 6 | 6 | 6 | 6 | 6 |
| | | 30 μm | 21 | 17 | 9 | 15 | 11 | 13 | 12 | 16 |
| | | 40 μm | 43 | 32 | 17 | 28 | 24 | 27 | 26 | 33 |
| | | 75 μm | 206 | 150 | 78 | 104 | 82 | 125 | 115 | 155 |
| | | 90 μm | 320 | 213 | 96 | 162 | 127 | 180 | 165 | 252 |
| Solubility of capsule | Solubility time of capsule (seconds) | BOTTOM: 30 μm Solubility time when used | 66 | 52 | 32 | 32 | 31 | 54 | 32 | 50 |
| | | Minimum thickness of bottom film after molding capsule | 26 μm | 27 μm | 26 μm | 28 μm | 26 μm | 27 μm | 28 μm | 28 μm |
| | | BOTTOM: 40 μm Solubility time when used | 99 | 60 | 39 | 62 | 67 | 84 | 59 | 61 |
| | | Minimum thickness of bottom film after molding capsule | 34 μm | 37 μm | 35 μm | 35 μm | 37 μm | 37 μm | 36 μm | 37 μm |

TABLE 1-continued

| Water-soluble film for the bottom | | | Example | | | | | | | |
|---|---|---|---|---|---|---|---|---|---|---|
| | | | 1 | 2 | 3 | 4 | 5 | 6 | 7 | 8 |
| | | BOTTOM: 50 μm Solubility time when used | 138 | 118 | 75 | 112 | 89 | 104 | 90 | 119 |
| | | Minimum thickness of bottom film after molding capsule | 46 μm | 45 μm | 45 μm | 46 μm | 44 μm | 45 μm | 44 μm | 47 μm |
| Pasted portion solubility (heat-seal) | 40° C. ASM-R (seconds) complete solubility time | TOP 75 μm BOTTOM 90 μm | >600 | >600 | 203 | 300 | 228 | >600 | 232 | >600 |
| | | TOP Comparative example 2 75 μm/ BOTTOM 90 μm | 548 | 420 | 176 | 262 | 209 | 407 | 196 | 425 |
| Pasted portion solubility (water-seal) | 40° C. ASM-R (seconds) complete solubility time | TOP 75 μm/ BOTTOM 90 μm | 155 | 179 | 124 | 160 | 145 | 177 | 138 | 172 |
| | | TOP Comparative example 2 75 μm/ BOTTOM 90 μm | 151 | 162 | 104 | 147 | 121 | 159 | 125 | 165 |
| Tension physical property | Tensile modulus (MPa) | 75 μm | 51 | 48 | 47 | 49 | 50 | 48 | 50 | 51 |
| | Water content (%) | | 7.2 | 6.9 | 7.7 | 7.5 | 8.0 | 7.0 | 8.2 | 8.8 |
| Processing property | Thermo-form suitability | 90 μm | good | good | good | good | good | good | good | good |
| Others | Capsule haptics | TOP 75 μm/ BOTTOM 75 μm | Excellent | Excellent | Excellent | Excellent | Excellent | Excellent | Excellent | Excellent |
| | Bleed property | 90 μm | good | good | good | good | good | good | good | good |

As a water-soluble film TOP is for the top, BOTTOM is for the bottom, respectively.

TABLE 2

| Water-soluble film for the bottom | | | Comparative example | | | | |
|---|---|---|---|---|---|---|---|
| | | | 1 | 2 | 3 | 4 | 5 |
| PVA (Parts by mass) | Resin 1 | | | | 100 | 100 | |
| | Resin 2 | | | | | | |
| | Resin 3 | | 100 | 100 | | | |
| | Resin 4 | | | | | | 100 |
| Plasticizer (Parts by mass) | Glycerin | | 30 | 21 | 21 | 30 | 21 |
| | Sorbitol | | | | | 15 | |
| Solubility of film alone | 20° C. ASM (seconds) Dispersion time/ complete solubility time | 20 μm | 2/8 | 2/8 | N.D. | N.D. | 2/8 |
| | | 30 μm | 3/10 | 4/11 | N.D. | N.D. | 4/10 |
| | | 40 μm | 7/13 | 8/15 | N.D. | N.D. | 6/14 |
| | | 75 μm | 22/37 | 24/38 | 65/147 | 54/115 | 22/39 |
| | | 90 μm | 31/49 | 34/53 | N.D. | N.D. | 33/57 |
| | 20° C. SD (seconds) Solubility time | 20 μm | 5 | 5 | N.D. | N.D. | 5 |
| | | 30 μm | 8 | 9 | N.D. | N.D. | 8 |
| | | 40 μm | 13 | 14 | N.D. | N.D. | 13 |
| | | 75 μm | 37 | 41 | 250 | 138 | 39 |
| | | 90 μm | 52 | 53 | N.D. | N.D. | 57 |
| Solubility of capsule | Solubility time of capsule (seconds) | BOTTOM: 30 μm Solubility time when used | 14 | 18 | N.D. | N.D. | 21 |
| | | Minimum thickness of bottom film after molding capsule | 28 μm | 29 μm | | | 29 μm |
| | | BOTTOM: 40 μm Solubility time when used | 30 | 23 | N.D. | N.D. | 31 |
| | | Minimum thickness of bottom film after molding capsule | 36 μm | 34 μm | | | 36 μm |
| | | BOTTOM: 50 μm Solubility time when used | 44 | 40 | N.D. | N.D. | N.D. |
| | | Minimum thickness of bottom film after molding capsule | 46 μm | 45 μm | | | N.D. |

TABLE 2-continued

| Water-soluble film for the bottom | | | Comparative example | | | | |
|---|---|---|---|---|---|---|---|
| | | | 1 | 2 | 3 | 4 | 5 |
| Pasted portion solubility (heat-seal) | 40° C. ASM-R (seconds) complete solubility time | TOP 75 μm/ BOTTOM 90 μm | 140 | 145 | N.D. | N.D. | N.D. |
| | | TOP Comparative example 2 75 μm/BOTTOM 90 μm | N.D. | N.D. | | | N.D. |
| Pasted portion solubility (water-seal) | 40° C. ASM-R (seconds) complete solubility time | TOP 75 μm/ BOTTOM 90 μm | 130 | 139 | N.D. | N.D. | N.D. |
| | | TOP Comparative example 2 75 μm/BOTTOM 90 μm | N.D. | N.D. | | | N.D. |
| Tension physical property | Tensile modulus (MPa) | 75 μm | 29 | 35 | 101 | 42 | 60 |
| | Water content (%) | | 8.1 | 7.5 | 6.7 | 5.9 | 7.7 |
| Processing property | Thermo-form suitability | 90 μm | good | good | Failing | good | Good |
| Others | Capsule haptics | TOP 75 μm/ BOTTOM 75 μm | good | Passed | N.D. | N.D. | Passed |
| | Bleed property | 90 μm | good | good | good | Failing | good |

As a water-soluble film TOP is for the top, BOTTOM is for the bottom, respectively.
N.D. indicates no data.

In Tables 1 and 2, the solubility of the film alone was evaluated based on the solubility criteria of 20° C. ASM (seconds) dispersion time/complete solubility time: when dispersion time was 30 seconds or more for a 75 μm film and the dispersion time was 40 seconds and more for a 90 μm film, it was OK, and anything outside of that range was not OK. In addition, the solubility criteria with 20° C. SD (seconds) solubility time was as follows: when the solubility was 50 seconds and more for a 75 μm film or the solubility was 70 seconds or more for a 90 μm film, it was OK, and anything outside of that range was not OK.

On the solubility of capsules the solubility criteria was as follows: when within 30 seconds the air and/or a detergent inside the capsule did not leak out, it was OK, and any other case was not OK.

On the solubility of the pasted portion the solubility criteria was as follows: within 10 minutes complete dissolution was OK, and outside of that range was not OK.

On the tension physical property the modulus criteria was as follows: in the case of 100 MPa or less it was OK, and outside of that range was not OK.

On the thermo-form and bleed properties it was evaluated on a 2-point scale of good, failing and on capsule haptics a 3-point scale of excellent, good, passed.

As evident from the results shown in Table 1, all test samples of the water-soluble film for the bottom, that is, the water-soluble film for molding the packaging capsule, the packaging capsule material for non-enclosing the liquid detergent, and the packaging capsule material for enclosing the liquid detergent shown in Examples 1-8 gave excellent results with respect to solubility, tension physical property, solubility of the pasted portion, processing suitability (thermo-form suitability), and other physical properties (capsule haptics and bleed resistance).

Specifically, the film of Example 1 uses the resin 1 alone in which a degree of saponification of anion-group-modified polyvinyl alcohols is set from 95 mol % or more to 99 mol % or less. When the film at thickness of 30 μm thereof shown in Example 1 was used as the water-soluble film material for the bottom for molding a capsule, the contents (detergents) could be kept in water at 20° C. for 60 seconds or more. Due to its soluble resistance, it is possible to make thin the film, and it is a superior point of view to reducing environmental load. In addition, because of the prescription of suitable amounts of a plasticizer, it is possible to get thermo-form and also it does not cause bleed-out of additives even for the film using a resin 1 alone as anion-group-modified polyvinyl alcohols.

The film of Example 3 uses the resin 2 alone in which the degree of saponification of anion-group-modified polyvinyl alcohols is set from 91 mol % or more to 96 mol % or less. When as the water-soluble film material for the bottom for molding a capsule, the film shown in Example 3 was used, it is possible to use in applications where the cold water solubility is required (for example, the application to a liquid detergent for clothes-washing), because the complete solubility time of the film alone under stirring in water at 20° C. is within 60 seconds at thickness of 75 μm thereof and within 90 seconds at thickness of 90 μm thereof. In addition, the pasted portion solubility (heat-seal) is completed within 300 seconds in water at 40° C., and this shows a good performance. Accordingly, even for the water-saving type dishwashing machine, which is currently mainstream, there is little risk to cause the residue of the film.

The films of Examples 2, 4-8 use the multiple resin combination of resin 1 and resin 2 or resin 4 as anion-group-modified polyvinyl alcohols wherein a degree of saponification and a degree of modification are different each other. Like the films of Examples 2, 4-8, in the case of the film composed of the multiple resin combination between resins 2, 4 in which a degree of saponification thereof is set from 91 mol % or more to 96 mol % or less and resin 1 in which a degree of saponification thereof is set from 95 mol % or more to 99 mol % or less it is easy to control solubility.

The films of Examples 2, 4 and 5 use the multiple resin combination of resin 1 and resin 2 as anion-group-modified polyvinyl alcohols by blending in a range of 70:30-30:70. And the film of Example 7 uses the multiple resin combination of resin 1 and resin 4 as anion-group-modified polyvinyl alcohols by blending at 70:30. These films have a time for starting a dissolution under static immersion in water at 20° C. being 80 seconds or more at thickness of 75 μm thereof, and show a good soluble resistance. In addition, as shown in Examples 2, 4, 5, and 7, when the films at thickness of 40 μm or 50 μm thereof were used as the water-soluble film material for the bottom for molding a capsule, this shows a performance to elute the contents (detergents) in a reasonable amount of time: in water at 20° C. being set from 50 seconds or more to 120 seconds or less.

In conclusion, it has an excellent balance of a soluble resistance and releasing the contents at a reasonable amount of time.

The films of Examples 2 and 4 use the multiple resin combination of resin 1 and resin 2 as anion-group-modified polyvinyl alcohols by blending in a range of 70:30-50:50. These films have a time for starting a dissolution under static immersion in water at 20° C. being 100 seconds or more at thickness of 75 μm thereof, and have a better soluble resistance. And hence, it is possible to apply to cavities with more complex shapes (in other words, more severe degree of deep drawing).

The film of Example 2 uses the multiple resin combination of resin 1 and resin 2 as anion-group-modified polyvinyl alcohols by blending at 70:30. This film has a large proportion of resin 1 with a higher degree of saponification having a soluble resistance, and has also a soluble resistance in water at 20° C. in excess of 30 seconds even when the film at thickness of 30 μm thereof was used as the water-soluble film material for the bottom for molding a capsule. Accordingly, in contrast to the films of Examples 4 and 5 where the contents elute within 30 seconds at 20° C. due to their deep-shaped cavities, the film of Example 2 can continue to hold the contents. In addition, blending a small amount of resin 2 with a lower degree of saponification shows a good performance compared with Example 1: the pasted portion solubility (heat-seal) is completed within 450 seconds in water at 40° C. In conclusion, the solubility of the film portion around the perimeter edge of the capsule prepared with a heat-seal method is faster than that of Example 1, and hence there is little risk to cause the residue of the film.

In Example 6, the same performance as the single composition of glycerin (Example 2) can be achieved even with the combination of a plasticizer other than glycerin.

Example 8 shows the composition in which a filler is added. This is the same resin blend as in Example 2, and hence the film of Example 8 has the same performance as in Example 2 even if it contains a filler.

In contrast, as shown in Table 2, because of the fact that in Comparative examples 1, 2 and 5 the solubility of the film alone was too fast, in some cases the film dissolved within 30 seconds in water at 20° C., and the contents eluted when this was used as the bottom side of the deep drawing-shaped capsule. In Comparative example 3 the film's tensile modulus was too high, so the film did not follow the cavity during vacuum molding, and hence a specified amount of the contents could not be entered. In Comparative example 4, the amount of the plasticizer was too much, so it bled out to the film surface over time. Thus, in the test samples of Comparative examples 1-5, one of them was not enough.

INDUSTRIAL APPLICABILITY

The water-soluble film for molding a packaging capsule and its use for the packaging capsule material for enclosing chemical agents of the present invention can be used for a packaging capsule enclosing the chemical agents, especially a liquid detergent.

What is claimed is:
1. A water-soluble film for molding a packaging capsule for enclosing chemical agents,
   comprising anion-group-modified polyvinyl alcohols including repeating units from a fatty acid vinyl ester comonomer and anion-group-containing repeating units, in which a degree of saponification thereof is set from 91 mol % or more to 99 mol % or less, and a degree of modification by anion groups is set from 1.0 mol % or more to 6.0 mol % or less,
wherein a total amount of anion-group modification of the anion-group-modified polyvinyl alcohols is set from 1.0 mol % or more to 3.5 mol % or less,
being formed by including from 22 parts by mass or more to less than 45 parts by mass of a plasticizer and at least 0.2 parts by mass of a surfactant, per 100 parts by mass of a total amount of the anion-group-modified polyvinyl alcohols,
having a thickness of from 20 μm or more to 100 μm or less,
having a tensile modulus of 20 MPa or more to 100 MPa or less determined in accordance with JIS K 7127 (1999) under conditions of:
   Measurement environment: 23° C., 50% RH,
   Film specimen: width 15 mm×length 150 mm,
   Film water content: 5-9%,
   Distance between chucks: 100 mm, and
   Tensile test speed: 300 mm/min,
wherein the anion-group-modified polyvinyl alcohols consist of a first anion-group-modified polyvinyl alcohol having a degree of saponification from 91 mol % or more to 96 mol % or less and a degree of polymerization of 1,600 or more to 1,900 or less, and a second anion-group-modified polyvinyl alcohol having a degree of saponification from 95 mol % or more to 99 mol % or less and a degree of polymerization of 1,600 or more to 1,900 or less,
wherein a mass ratio between the first anion-group-modified polyvinyl alcohol and the second anion-group-modified polyvinyl alcohol is 20-80:80-20,
wherein the respective repeating units from the fatty acid vinyl ester comonomer and the anion-group-containing repeating units of the first anion-group-modified polyvinyl alcohol and the second anion-group-modified polyvinyl alcohol are the same,
   wherein the anion-group-containing repeating units are selected from the group consisting of maleic acid, itaconic acid, and fumaric acid,
wherein the degree of saponification of the first anion-group-modified polyvinyl alcohol is lower than the degree of saponification of the second anion-group-modified polyvinyl alcohol; and
wherein a time for starting a dispersion of the water-soluble film under stirring in water at 20° C. is 30 seconds or more at a film thickness of 75 μm, and is 40 seconds or more at a film thickness of 90 μm, and/or a time for starting a dissolution of the water-soluble film under static immersion in water at 20° C. is 50 seconds or more at a film thickness of 75 μm, and is 70 seconds or more at a film thickness of 90 μm.
2. The water-soluble film according to claim 1, wherein a viscosity of a 4 mass % aqueous solution of the anion-group-modified polyvinyl alcohols is set from 24 mPa·s or more to 45 mPa·s or less.
3. A packaging capsule material for enclosing chemical agents comprising:
   a combination of:
      the water-soluble film for molding a packaging capsule for enclosing chemical agents according to claim 1, and
      another water-soluble film for a top that includes one or more anion-group-modified polyvinyl alcohol(s) including repeating units from a fatty acid vinyl ester comonomer and anion-group-containing repeating units, in which a degree of saponification thereof is set from 86 mol % or more to 99 mol % or less.

4. The packaging capsule material according to claim 3, wherein the packaging capsule material for enclosing chemical agents has a soluble resistance so as not to elute chemical agents within 30 seconds into water at 20° C.

5. The packaging capsule material according to claim 3, wherein the water-soluble film for molding the packaging capsule and the water-soluble film for the top have a solubility such that film portions around a perimeter edge of the packaging capsule material for enclosing chemical agents formed by pasting those films together, are solved within 10 minutes in water at 40° C.

\* \* \* \* \*